Sept. 29, 1964    J. C. SEREDA    3,150,639
WATERING DEVICE FOR ANIMALS
Filed June 17, 1963    2 Sheets-Sheet 1
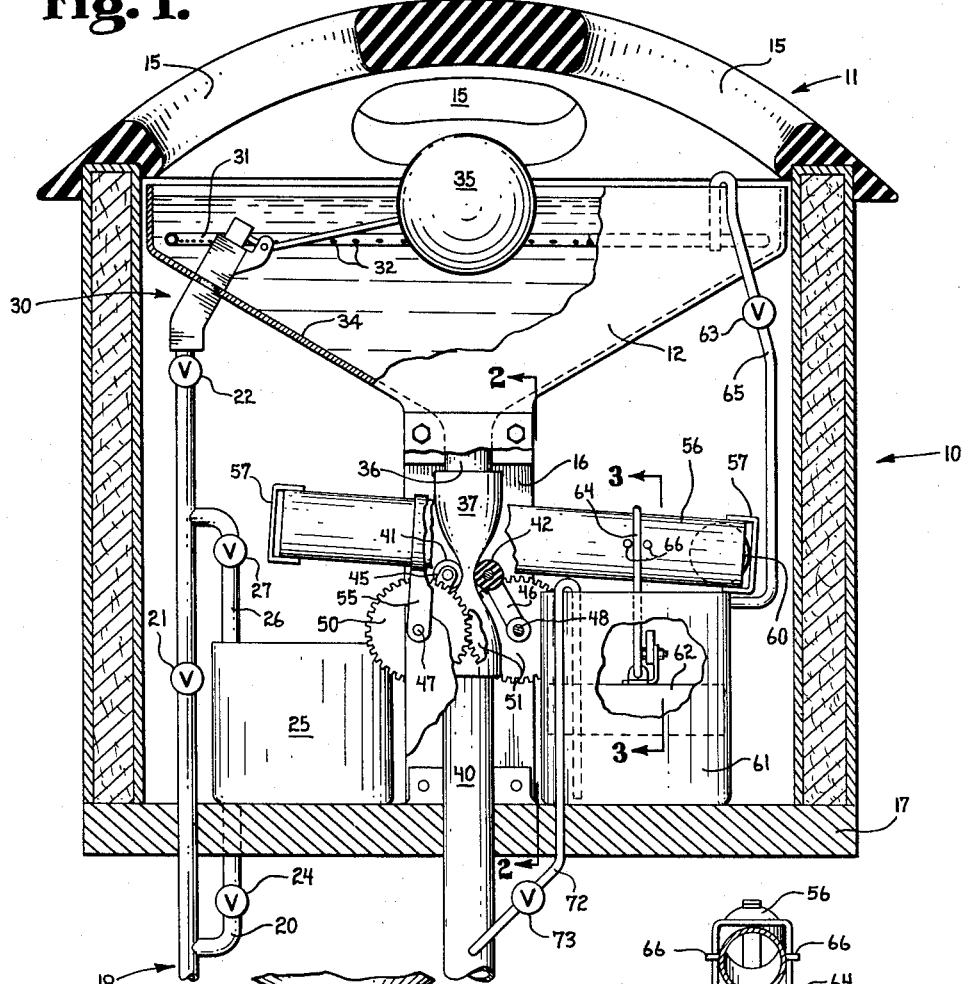
Fig. 1.
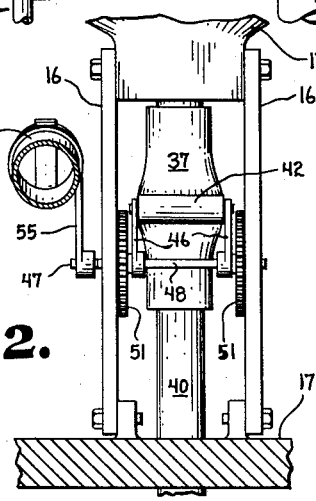
Fig. 2.
Fig. 3.
INVENTOR.
JOSEF C. SEREDA
BY Lockwood, Woodard, Smith & Weikart
Attorneys

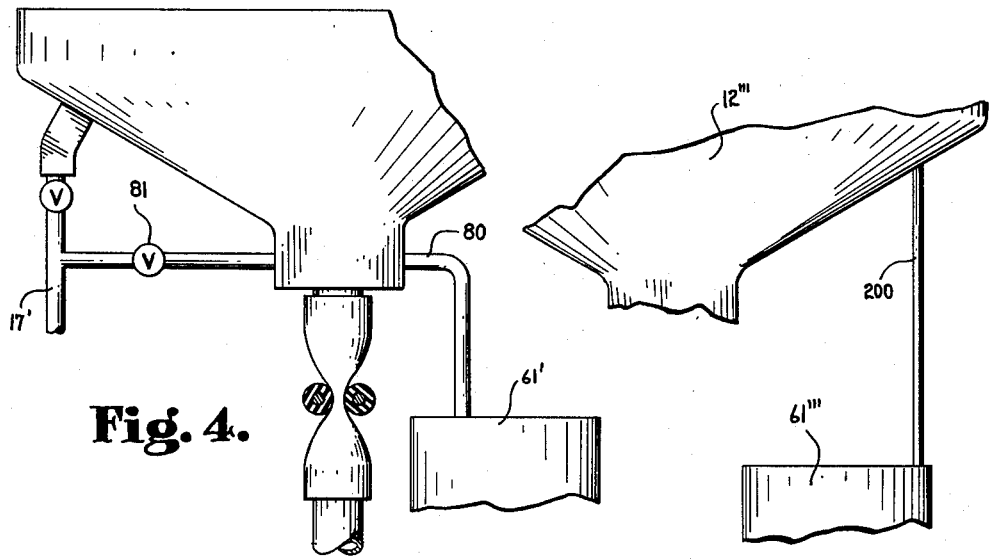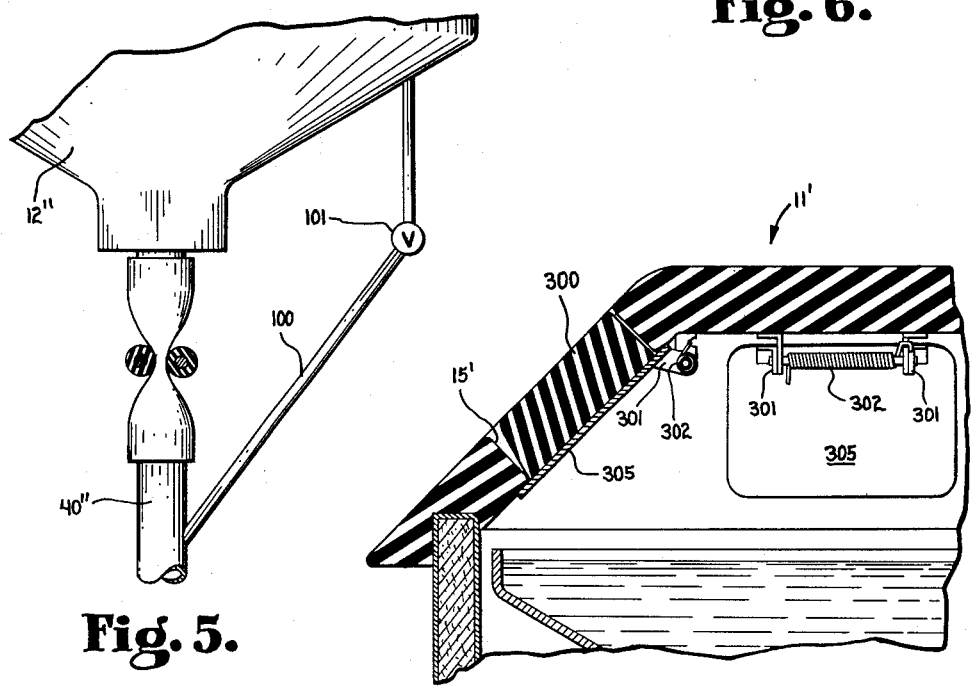

United States Patent Office 3,150,639
Patented Sept. 29, 1964

3,150,639
WATERING DEVICE FOR ANIMALS
Josef C. Sereda, 962 Pennsylvania St., Indianapolis, Ind.
Filed June 17, 1963, Ser. No. 288,168
5 Claims. (Cl. 119—78)

The present invention relates to a watering device for livestock.

The supplying of water to farm animals requires the aid of a device which operates continuously to supply the water. Such devices are in most cases attached to a pipeline from a water pump and frequently incorporate a floater valve to maintain the water level constant. One disadvantage of such waterers is the fact that they are difficult to keep clean. Consequently, one object of the present invention is to provide a watering device which is self cleaning.

A further object of the present invention is to provide a watering device which prevents freezing of the water in cold weather without the use of fuel.

Still another object of the invention is to provide a watering device which incorporates means for distributing medication.

Another object of the invention is to provide a watering device which will maintain a predetermined water level.

Still a further object of the invention is to provide a watering device which is simple, compact and relatively inexpensive.

Related objects and advantages will become apparent as the description proceeds.

One illustrative embodiment of the invention might include an automatic water dispenser for animals comprising a bowl, a spray ring surrounding said bowl, a water supply conduit leading into said spray ring, said spray ring having a plurality of spray apertures which are directed downwardly into the bowl whereby water pressure within said spray ring flushes out said bowl, a valve controlling flow from said water supply conduit into said spray ring, float means received in said bowl and controlling said valve to turn on the water supply when the water level drops below a predetermined level, said bowl having an outlet at its lowermost portion, a drain conduit, a rubber conduit connecting said bowl outlet and said drain conduit, a pair of rollers each swingably mounted on opposite sides of said rubber conduit for swinging movement into pinching-off-engagement with said rubber conduit, a pair of rotatably mounted shafts having said rollers fixedly mounted thereon, a pair of meshing gears each fixed to one of said shafts, a tube fixed to one of said shafts, a ball received within said tube, a reservoir, a float within said reservoir, said float being adapted, when said reservoir is filled, to raise one end of said tube to cause said ball to roll to the other end thereof to cause said tube to tilt to a first position, guide means mounted on said float and adapted, when said reservoir is empty, to force the one end of said tube down to cause said ball to roll to the other end thereof and to cause said tube to assume a second position, said rollers pinching off said rubber conduit when said tube is in said second position, a conduit leading from said spray ring to said reservoir, and a siphon leading from said reservoir to said drain conduit.

The full nature of the invention will be understood from the accompanying drawings and the following description and claims.

FIG. 1 is a vertical section taken through the watering device of the present invention.

FIG. 2 is a vertical section taken along the lines 2—2 of FIG. 1 in the direction of the arrows.

FIG. 3 is a vertical section taken along the line 3—3 of FIG. 1 in the direction of the arrows.

FIG. 4 is a fragmentary schematic view similar to FIG. 1 of an alternative embodiment of the invention.

FIG. 5 is a view similar to FIG. 4 of a further alternative embodiment of the invention.

FIG. 6 is a view similar to FIG. 4 of still another alternative embodiment of the invention.

FIG. 7 is a fragmentary view similar to FIG. 1 showing still another alternative embodiment of the invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated a watering device which includes an insulated container 10 having a dome top 11 which is formed of insulating material. Received within the container 10 is a conical bowl 12, access to which can be had by the farm animals through openings 15 in the dome top 11. The bowl 12 is fixedly supported upon two vertical bars 16 which are fixed in parallel vertically extending spaced relation to the base 17 of the container 10 and to the bowl 12.

Water under pressure is admitted to the device through an inlet conduit 18 from which leads a further conduit 20. The conduit 18 is provided with two standard commercially available valves 21 and 22 which can be manually regulated to any desired setting. The conduit 20 is provided with a manually regulatable valve 24 and leads into medication container 25. A further conduit 26 leads out of the medication container and is controlled by a valve 27. The conduit 26 connects to the conduit 18.

It can be appreciated that by suitable setting of the valves 21, 24 and 27, the amount of medication added to inlet water can be controlled. For example, if valves 24 and 27 are closed completely and valve 21 is opened completely, no medication will be added to the inlet water passing through the valve 22. On the other hand, if the valves 21, 24 and 27 are adjusted to intermediate settings, medication will be added to the inlet water and will be present in the inlet water as it passes through the inlet valve 22.

The purpose of the valve 22 is to control the rate of flow of inlet water into the bowl 12. Mounted so as to extend through the wall of the bowl 12 is a standard commercially available float valve 30. The conduit 18 leads through the valves 22 and 30 into a spray ring 31 which surrounds the bowl 12 and includes a plurality of spray apertures 32 so aimed as to wash the adjacent surface 34 of the bowl. When the water level within the bowl drops below a certain predetermined level, the float 35 moves downwardly and opens the valve 30 causing water pressure to spray from the apertures 32. When the water level has risen above a certain predetermined level, the float 35 shuts off the valve 30.

The bowl 12 has a drain outlet 36 at its apex, said outlet having a rubber conduit 37 received thereon. The rubber conduit 37 is also received upon the upper end of a rigid drain conduit 40 which extends through the base 17 of the container 10. A pair of rollers 41 and 42 are formed of rubber or the like and can be used to shut off flow through the rubber conduit 37. When the rollers 41 and 42 are in pinching engagement with the flexible conduit 37, flow out of the bowl 12 through the outlet 36 is shut off.

Referring to FIG. 2, each of the rollers 41 and 42 is mounted upon respective arms 45 and 46 which are fixed to shafts 47 and 48. The shafts 47 and 48 are pivotally mounted within the upright members 16. Fixed to the shafts 47 and 48 are meshing gears 50 and 51. The shaft 47 also has fixed thereto, by means of an arm 55, an elongated cylindrical tube 56, the ends of which are closed off by members 57 fixedly secured to the tube. The tube 56 has a heavy ball 60 received therein, said ball being of a suitable size that it can roll the length of the tube 56.

Resting upon the bottom 17 of the container 10 is a reservoir 61 within which is received a float 62. The spray ring 31 has secured thereto and in communication therewith a water conduit 65 which leads into the reservoir 61, the valve 63 controlling flow through said conduit 65. The U-shaped loop 64 is received about the tube 56 and extends between two outwardly extending projections 66. The U-shaped loop 64 has two inwardly turned ends 67 which extend through brackets 70 fixed to the float 62. Also fixed to the upper surface of the float 62 is a bumper 71. The reservoir 61 has a siphon 72 which extends into and is in communication with the drain conduit 40 and is controlled by a valve 73.

The device operates in the following manner. When an animal drinks by extending its nose through the openings 15, the water level in the bowl drops causing the float 35 to also drop and a small quantity of water to flow into the bowl through the spray ring 31. Each time an animal drinks, a small trickle of water also flows into the reservoir 61 through the conduit 65. Consequently, the float 62 in the reservoir rises a small amount at a time until the bumper 71 engages the ball tube 56 and starts to lift it. Continued flow of water into the reservoir 61 through the conduit 65 eventually causes the tube 56 to be tilted to such an extent that the ball 60 rolls leftwardly until it engages the stop member 57. As a result, the tube 56 flips into a tilted position with the tube engaging the U-shaped member 64.

Such flipping of the tube causes the rollers 41 and 42 to move rapidly apart whereby the relatively large flexible conduit and drain outlet and conduit permit the water within the bowl to flow out of the bowl at a relatively rapid rate flushing out the bowl and removing dirt which is in the bowl as a result of the animals drinking therefrom. The fact that the water has all been removed from the bowl causes the float 35 to drop to a position in which the valve 30 is fully open and the spray ring sprays the inside of the bowl at full water pressure which also produces a flushing action of the bowl.

The sudden gush of water from the bowl actuates the siphon 72. Water which has accumulated in the reservoir 61 flows out through the siphon 72 and causes the float 62 to drop and to pull the tube 56 back toward the illustrated position. When the reservoir 61 is again empty, the steel ball returns again to its original illustrated position position which pinches the rollers against the flexible tube 37 and closes off the tubing.

The intensity of the washing action can be regulated in two different ways. First, the frequency of the washing action can be adjusted by means of the valve 63 controlling flow through the tubing 65. The greater the rate at which the water flows through the tubing 65, the more rapidly the reservoir is filled. The duration of the washing action can be controlled by adjustment of the valve 73 which causes the rollers 41 and 42 to pinch off the flexible tubing 37 for a longer or a shorter period of time.

Since water has a very high specific heat, a small quantity of it carries sufficient heat to prevent freezing of the water bowl. To make use of this phenomena, a leak may be provided somewhere in the bowl 12 in order to keep the water flowing. Alternatively, the various embodiments of FIGS. 4–6 can be used to prevent freezing of the water. The embodiment of FIG. 4 is identical to the embodiment of FIG. 1 with the exception that an additional line 80 is provided between the inlet conduit 17′ and the reservoir 61′. This additional conduit is controlled by the valve 81. As a result of the structure of FIG. 4, the reservoir 61′ is filled whether or not an animal drinks and, therefore, intentional washing of the bowl and movement of the water near the freezing point is produced preventing the water from freezing within the bowl.

The structure of FIG. 5 is identical to that of FIG. 1 with the exception that a conduit 100 is controlled by a valve 101 and produces an intentional leakage of water from the bowl 12″ into the drain conduit 40″.

In FIG. 6 an additional conduit 200 is added which leads from the bowl 12‴ to the reservoir 61‴. The intentional leak conduit of FIG. 6 produces a similar intentional washing action at intervals as the device of FIG. 4. The device of FIG. 6 is otherwise identical to the device of FIG. 1.

Referring to FIG. 7, an alternative embodiment is illustrated which is identical to the device of FIG. 1 with the exception that the dome top 11′ has doors 300 mounted thereon so as to control access to the bowl through the openings 15′. These doors 300 are mounted upon hinges 301 which incorporate coil springs 302. Secured to one surface of the doors 300 is a plate member 305 which normally engages the dome top 11′ under the spring action of the hinges. When an animal desires to drink, he forces his nose through the door 300 opening the door against the spring action of the hinges 301. The embodiment of FIG. 7 is particularly desirable in freezing weather in that it reduces the rate of heat removal from the water.

It will be evident from the above description that the present invention provides an improved watering device which is self-cleaning and which prevents freezing of the water supply in cold weather without the use of fuel. It will also be evident from the above description that the watering device of the present invention incorporates highly efficient means for the distribution of medication to animals. The present invention is also, as will be evident from the description and drawing, a simple, compact and relatively inexpensive structure.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. An automatic water dispenser for animals comprising a bowl, means for spraying the bowl, said spray means having a plurality of spray apertures which are directed downwardly into the bowl whereby water pressure from said spraying means flushes out said bowl, a first valve controlling water to said spray means, float means received in said bowl and controlling said valve to turn on the water and said spray means when the water level drops below a predetermined level, said bowl having an outlet means at its lowermost portion, means for opening and closing said outlet, a water receptacle, a conduit leading from said spray means to said receptacle and conveying a portion of the spray means water to said water receptacle, second float means received in said water receptacle and arranged to open said outlet upon rising above a predetermined height in said receptacle and to close said outlet upon dropping below a predetermined height in said receptacle, a siphon leading from said receptacle to said outlet means and adapted to empty said receptacle when said outlet is opened, and second and third adjustable valves controlling rate of flow through said siphon and through said conduit, respectively.

2. An automatic water dispenser for animals comprising a bowl, a spray ring surrounding said bowl, a water supply conduit leading into said spray ring, said spray ring having a plurality of spray apertures which are directed downwardly into the bowl whereby water pressure within said spray ring flushes out said bowl, a valve controlling flow from said water supply conduit into said spray ring, float means received in said bowl and controlling said valve to turn on the water supply when the water level drops below a predetermined level, said bowl having an outlet at its lowermost portion, a drain conduit, a rubber conduit connecting said bowl outlet and said drain conduit, a pair of rollers each positioned on opposite sides of said rubber conduit for swinging movement into pinching-off-engagement with said rubber conduit, a pair of rotatably mounted shafts having said rollers fixedly mounted thereon, a pair of meshing gears each fixed to one of said shafts, a tube fixed to one of said shafts, a ball received within said tube, a reservoir, a float within said reservoir, said float being adapted, when said reservoir is filled, to raise one end of said tube to cause said ball to roll to the other end thereof to cause said tube to tilt to a first position, guide means mounted on said float and adapted, when said reservoir is empty, to force the one end of said tube down to cause said ball to roll to the other end thereof and to cause said tube to assume a second position, said rollers pinching off said rubber conduit when said tube is in said second position, a conduit leading from said spray ring to said reservoir, and a siphon leading from said reservoir to said drain conduit.

3. The device of claim 2 additionally comprising a conduit leading from said water supply conduit to said reservoir to provide a continuous flow of water therebetween.

4. An automatic water dispenser for animals comprising a bowl, a frame supporting said bowl, a spray ring surrounding said bowl, a water supply conduit leading into said spray ring, said spray ring having a plurality of spray apertures which are directed downwardly into the bowl whereby water pressure within said spray ring flushes out said bowl, a valve controlling flow from said water supply conduit into said spray ring, float means received in said bowl and controlling said valve to turn on the water supply when the water level drops below a predetermined level, said bowl having an outlet at its lowermost portion, a drain conduit, a rubber conduit connecting said bowl outlet and said drain conduit, a pair of rollers each positioned on opposite sides of said rubber conduit for swinging movement into pinching-off-engagement with said rubber conduit, a pair of rotatably mounted shafts having said rollers fixedly mounted thereon, a pair of meshing gears each fixed to one of said shafts, a tube fixed to one of said shafts, a ball received within said tube, a reservoir, a float within said reservoir, said float being adapted, when said reservoir is filled, to raise one end of said tube to cause said ball to roll to the other end thereof to cause said tube to tilt to a first position, guide means mounted on said float and adapted, when said reservoir is empty, to force the one end of said tube down to cause said ball to roll to the other end thereof and to cause said tube to assume a second position, said rollers pinching off said rubber conduit when said tube is in said second position, a conduit leading from said spray ring to said reservoir, adjustable valve means controlling flow through said last mentioned conduit, a siphon leading from said reservoir to said drain conduit, and adjustable valve means controlling flow through said siphon.

5. The automatic water dispenser of claim 1 additionally comprising a valve controlled conduit leading to said receptacle from upstream of said first valve and providing a continuous flow of water whereby said receptacle is filled and said bowl is emptied at predetermined intervals whether or not animals drink from said bowl.

References Cited in the file of this patent
UNITED STATES PATENTS

| | | |
|---|---|---|
| 920,781 | Simmons | May 4, 1909 |
| 2,490,824 | Meisner | Dec. 13, 1949 |
| 2,701,548 | Wolfe | Feb. 8, 1955 |